3,138,582
1- AND 2-(D-RIBOFURANOSYL)-5,6-DICHLOROBENZOTRIAZOLE

Paul E. Wittreich, Colonia, and Karl A. Folkers, Plainfield, N.J., and Franklin M. Robinson, Ambler, Pa., assignors to Merck & Co., Inc., Rahway, N.J., a corporation of New Jersey
No Drawing. Filed Dec. 19, 1960, Ser. No. 76,463
6 Claims. (Cl. 260—211.5)

This invention relates to 1- and 2-(D-ribofuranosyl)-5,6-dichlorobenzotriazoles.

The compounds of this invention are prepared by refluxing 3,5-di-O-benzoyl-D-ribofuranosyl chloride with the silver salt of 5,6-dichlorobenzotriazole in xylene. The reaction mixture is then worked up by various crystallization techniques, as illustrated in the following examples, to isolate the various isomers in the form of dibenzoates, which in turn are debenzoylated with ammonia. The various fractions isolated are the isomers included within the scope of the invention. Thus, the ribofuranosyl group may be on either the 1- or 2-position of the triazole ring and may be in either the $\alpha$ or $\beta$ configuration.

The compounds of this invention are useful in the preparation of vitamin $B_{12}$-like compounds. They are added to the usual fermentation mixture for vitamin $B_{12}$ production and the products isolated have 1- and 2-(D-ribofuranosyl) - 5,6 - dichlorobenzotriazole moieties incorporated in their structure.

This invention can be illustrated by the following examples:

EXAMPLE 1

*Reaction Between the Silver Salt of 5,6-Dichlorobenzotriazole and 3,5-Di-O-Benzoyl-D-Ribofuranosyl Chloride*

Five grams of 5,6-dichlorobenzotriazole is dissolved in 6 N ammonium hydroxide and 150 ml. of ethanol. To this solution is added a solution of 6.5 g. of silver nitrate dissolved in 150 ml. of water. Immediate precipitation occurs and the reaction mixture is allowed to stand at room temperature for one day. The precipitate is collected, washed with dilute ammonium hydroxide, and dried to constant weight in vacuo over phosphorus pentoxide. A quantitative yield (7.85 g.) of the silver salt is obtained.

3,5-di-O-benzoyl-D-ribofuranosyl chloride is freshly prepared from 1,3,5-tri-O-benzoyl-$\alpha$-D-ribofuranose essentially, according to the procedure of Ness et al. [J. Am. Chem. Soc., 78, 4710 (1956)].

A suspension of 7.9 g. of 3,5-di-O-benzoyl-D-ribofuranosyl chloride in 100 ml. of xylene is added directly to a hot stirred suspension of 7.85 g. of the silver salt of 5,6-dichlorobenzotriazole in 450 ml. of xylene. A small amount (50 ml.) of xylene is distilled as a final drying measure. The solution is then refluxed and stirred for three hours, allowed to cool to room temperature and then refrigerated overnight.

EXAMPLE 2

*1-(3,5-Di-O-Benzoyl-$\beta$-D-Ribofuranosyl)-5,6-Dichlorobenzotriazole*

The insoluble product from Example 1 which formed overnight is collected and washed with a small amount of xylene. The washings are combined with the mother liquor and put aside from Example 3. A suspension of the solid in 100 ml. of chloroform is boiled and filtered, and the operation is repeated until the weight of the residue is constant. The chloroform portions are combined and concentrated to dryness in vacuo, leaving a white crystalline residue. The residue is recrystallized from 10% aqueous acetone and washed with acetone-water (10:1). The product is obtained in the form of small feathery needle crystals; yield 430 mg.; M.P. 233–235°; $[\alpha]_D^{21}$ —104.2° (c. 1, in pyridine);

$\lambda_{max.}^{CHCl_3}$ 265 m$\mu$ ($E_{1 cm.}^{1\%}$ 165), 273 m$\mu$ shoulder (158), 299 m$\mu$ (80).

*Analysis.*—Calcd. for $C_{25}H_{19}N_3Cl_2O_6$: C, 56.83; H, 3.62; N, 7.95. Found: C, 56.90; H, 3.92; N, 8.48.

EXAMPLE 3

*2-(3,5-Di-O-Benzoyl-$\beta$-D-Ribofuranosyl)-5,6-Dichlorobenzotriazole*

The xylene mother liquor from Example 2 is concentrated to dryness in vacuo leaving an oil. The residue is dissolved in 80 ml. of methylene dichloride and 200 ml. of petroleum ether is added, bringing the solution to slight turbidity. Crystals form after the solution is allowed to stand for one day at room temperature. The mixed crystals are collected and washed with 60 ml. of methylene dichloride-petroleum ether (2:5) which then is combined with the mother liquor. The washed crystals (2.4 g., M.P. 120–150°) are dissolved in 50 ml. of acetone and 15 ml. of water is added. The product crystallizes in the form of rosettes after standing for one day at room temperature. The crystals are collected and washed with 20 ml. of acetone-water (5:1.5), which is combined with the acetone-water mother liquor for use in Example 4. These washed crystals weighed 290 mg. and melted at 186–188°. Two recrystallizations of this product, once from acetone and once from acetone-ether, give an analytically pure sample; $[\alpha]_D^{21}$ —82.8° (c. 1, in pyridine);

$\lambda_{max.}^{CHCl_3}$ 286 m$\mu$ ($E_{1 cm.}^{1\%}$ 222) shoulder, 297.5 m$\mu$ (254), 307 m$\mu$ (224).

*Analysis.*—Calcd. for: $C_{25}H_{19}N_3Cl_2O_6$: C, 56.83; H, 3.62; N, 7.95. Found: C, 56.79; H, 3.26; N, 8.55.

EXAMPLE 4

*1-(3,5-Di-O-Benzoyl-$\alpha$-D-Ribofuranosyl)-5,6-Dichlorobenzotriazole*

Fifteen milliliters of water is added to the acetone-water mother liquor of 2-(3,5-di-O-benzoyl-$\beta$-D-ribofuranosyl)-5,6-dichlorobenzotriazole from Example 3. Crystallization of the product in the form of long needle crystals takes place immediately; yield 350 mg.; M.P. 155–156°; $[\alpha]_D^{21}$ +77.7° (c. 1, in pyridine);

$\lambda_{max.}^{CHCl_3}$ 266 m$\mu$ ($E_{1 cm.}^{1\%}$ 164), 273 m$\mu$ shoulder (161), 298 m$\mu$ (84.5).

*Analysis.*—Calcd. for $C_{25}H_{19}N_3Cl_2O_6$: C, 56.83; H, 3.62; N, 7.95. Found: C, 56.78; H, 3.57; N, 8.26.

EXAMPLE 5

*2-(3,5-Di-O-Benzoyl-$\alpha$-D-Ribofuranosyl)-5,6-Dichlorobenzotriazole*

Ten milliliters of methylene dichloride and 100 ml. of petroleum ether are added to the methylene dichloride-petroleum ether mother liquor from Example 3, and a mixture of small needle crystals and clear ball-like crystals forms over a period of two weeks. These crystalline forms are separated physically. The needle crystals weighed .7 g. and melted at 137–139°. The ball-shaped crystals weighed 1.2 g. and melted at 169–171° (see below). The needle-shaped crystals are recrystallized from acetone-water (4:5) to yield 300 mg. of 2-(3,5-di-O-benzoyl - $\alpha$ - D-ribofuranosyl)-5,6-dichlorobenzotriazole; M.P. 163–164°; $[\alpha]_D^{21}$ +35.8° (c. 1, in pyridine);

$\lambda_{max.}^{CHCl_3}$ 286, m$\mu$ shoulder (E$_{1cm.}^{1\%}$ 202), 297.5 m$\mu$ (231), 307 m$\mu$ (203).

*Analysis.*—Calcd. for $C_{25}H_{19}N_3Cl_2O_6$: C, 56.83; H, 3.62; N, 7.95. Found: C, 57.18; H, 3.69; N, 8.56.

The ball-shaped crystals, which have been separated from 2-(3,5-di-O-benzoyl-α-D-ribofuranosyl)-5,6-dichlorobenzotriazole, are recrystallized from 50 ml. acetone—10 ml. water to yield 920 mg. of granular crystals melting at 174–175°. The granular crystals (208 mg.) are recrystallized from acetone-water (4:1) yielding 198 mg. of product melting at 174–175° and resolidifying immediately and remelting at 233–235°. Once a sample has been heated to 235° and re-solidified, the compound melts at 233–235° without transition. The product (198 mg.) is recrystallized from acetone water (4:1) after a seed of 1-(3,5-di-O-benzoyl-β-D-ribofuranosyl)-5,6-dichlorobenzotriazole is added. After standing at room temperature for two days the solution yields 188 mg. of product in the form of feathery needle crystals; M.P. 233–235° (admixture with the 1-β isomer causes no depression in melting point); $[\alpha]_D^{21}$ —100.9° (c. 1, in pyridine), and ultraviolet absorption spectrum is identical to that of the 1-β isomer.

EXAMPLE 6

*1-(β-D-Ribofuranosyl)-5,6-Dichlorobenzotriazole*

Two hundred milligrams of 1-(3,5-di-O-benzoyl)-β-D-ribofuranosyl)-5,6-dichlorobenzotriazole is suspended in 50 ml. of methanol saturated with ammonia and left to stand for two days at 5°. The solution is filtered and concentrated to dryness in vacuo leaving an oil which partially crystallizes. The product is crystallized by dissolving the residue in 10 ml. of hot water and 1 ml. of ethanol and cooling to room temperature slowly. Recrystallization of the product from 5 ml. of water yields 47 mg. of product in the form of small needle crystals; M.P. 176–178°; $[\alpha]_D^{21.5}$ —135.9;(c. 1, in pyridine);

$\lambda_{max.}^{CHCl_3}$ 266 m$\mu$ (E$_{1cm.}^{1\%}$ 208), 272 m$\mu$ shoulder (192), 299 m$\mu$ (130).

*Analysis.*—Calcd. for $C_{11}H_{11}N_3Cl_2O_4$: C, 41.27; H, 3.46; N, 13.13. Found: C, 41.90; H, 3.79; N, 13.54.

EXAMPLE 7

*2-(β-D-Ribofuranosyl)-5,6-Dichlorobenzotriazole*

Two hundred milligrams of 2-(3,5-di-O-benzoyl-β-D-ribofuranosyl)-5,6-dichlorobenzotriazole is dissolved in 50 ml. of cold methanol saturated with ammonia and left to stand at 5° for two days. The solution is concentrated to dryness in vacuo leaving an oil. The residue is taken up in 10 ml. of hot water—1 ml. of methanol and crystallized slowly at room temperature. Recrystallization of this material from 5 ml. water yields 104 mg. of product in the form of small granular crystals; M.P. 149–151°; $[\alpha]_D^{22}$ —89.0° (c. 1, in pyridine);

$\lambda_{max.}^{CHCl_3}$ 288 m$\mu$ shoulder (E$_{1cm.}^{1\%}$ 349), 297.5 m$\mu$ (417), 307 m$\mu$ (360).

*Analysis.*—Calcd. for $C_{11}H_{11}N_3Cl_2O_4$: C, 41.27; H, 3.46; N, 13.13. Found: C, 41.68; H, 3.48; N, 13.46.

EXAMPLE 8

*1-(α-D-Ribofuranosyl)-5,6-Dichlorobenzotriazole*

Two hundred milligrams of 1-(3,5-di-O-benzoyl-α-D-ribofuranosyl)-5,6-dichlorobenzotriazole is dissolved in 50 ml. of cold methanol saturated with ammonia and left to stand at 5° for two days. The procedure of Example 6 is followed. The yield is 50 mg. of product in the form of silky needles; M.P. 166–168°. $[\alpha]_D^{21.5}$ +115.8° (c. 1, in pyridine);

$\lambda_{max.}^{CHCl_3}$ 267 m$\mu$ (E$_{1cm.}^{1\%}$ 226), 274 m$\mu$ shoulder (210), 300 m$\mu$ (141).

*Analysis.*—Calcd. for $C_{11}H_{11}N_3Cl_2O_4$: C, 41.27; 3,46; N, 13.13. Found: C, 41.42; H, 3.50; N, 13.53.

EXAMPLE 9

*2-(α-D-Ribofuranosyl)-5,6-Dichlorobenzotriazole*

Two hundred milligrams of 2-(3,5-di-O-benzoyl-α-D-ribofuranosyl)-5,6-dichlorobenzotriazole is dissolved in 50 ml. of cold methanol saturated with ammonia and left at 5° for two days. The procedure of Example 6 is followed. The yield is 71 mg. of product in the form of small granular crystals; M.P. 112–114°; $[\alpha]_D^{22}$ +5.2° (c. 1, in pyridine);

$\lambda_{max.}^{CHCl_3}$ 290 m$\mu$ shoulder (E$_{1cm.}^{1\%}$ 334), 298 m$\mu$ (388), 307 m$\mu$ (324).

*Analysis.*—Calcd. for $C_{11}H_{11}N_3Cl_2O_4$: C, 41.27; H, 3.46; N, 13.13. Found: C, 40.84; H, 3.62; N, 13.67.

We claim:
1. Compounds selected from the group consisting of 1-(α-D-ribofuranosyl)-5,6-dichlorobenzotriazole, 1-(β-D-ribofuranosyl) - 5,6-dichlorobenzotriazole, 2-(α-D-ribofuranosyl) - 5,6-dichlorobenzotriazole, and 2-(β-D-ribofuranosyl)-5,6-dichlorobenzotriazole.
2. 1-(α-D-ribofuranosyl)-5,6-dichlorobenzotriazole.
3. 1-(β-D-ribofuranosyl)-5,6-dichlorobenzotriazole.
4. 2-(α-D-ribofuranosyl)-5,6-dichlorobenzotriazole.
5. 2-(β-D-ribofuranosyl)-5,6-dichlorobenzotriazole.
6. A process of preparing 1- and 2-(D-ribofuranosyl)-5,6-dichlorobenzotriazoles which comprises refluxing a benzene suspension of the silver salt of 5,6-dichlorobenzotriazole with 3,5-di-O-benzoyl-D-ribofuranosyl chloride, isolating from the reaction mixture the resulting isomeric 1 and 2 substituted benzotriazoles, and treating a methanol solution of the said latter compounds with ammonia to effect saponification of the benzoyl groups.

References Cited in the file of this patent

UNITED STATES PATENTS 2,860,131    Folkers et al. _____ Nov. 11, 1958

OTHER REFERENCES

Ford et al.: Biochemical Jr. 59 (1955), pages 86–92.